United States Patent [19]

Akiyama et al.

[11] Patent Number: 4,491,787
[45] Date of Patent: Jan. 1, 1985

[54] FLATNESS MEASURING DEVICE

[75] Inventors: Nobuyuki Akiyama; Yukio Kembo; Yasuo Nakagawa, all of Yokohama, Japan

[73] Assignee: Hitachi, Ltd., Tokyo, Japan

[21] Appl. No.: 292,933

[22] Filed: Aug. 14, 1981

[30] Foreign Application Priority Data

Aug. 29, 1980 [JP] Japan ................................. 55-118497

[51] Int. Cl.³ ............................................ G01N 27/00
[52] U.S. Cl. .................................. 324/71.5; 324/61 P
[58] Field of Search .............. 29/574; 324/71.5, 61 P, 324/73 PC, 61 R, 225, 134; 356/371, 426; 73/37.5, 37.7

[56] References Cited

U.S. PATENT DOCUMENTS

| | | | |
|---|---|---|---|
| 2,217,435 | 5/1938 | Edler | 324/134 |
| 3,611,120 | 10/1971 | Forster | 324/225 |
| 3,679,972 | 7/1972 | Michelson | 324/61 R |

OTHER PUBLICATIONS

Wafer Scan II, ADE Corp., Bulletin 383A, 1978

*Primary Examiner*—Michael J. Tokar
*Assistant Examiner*—Kevin D. O'Shea
*Attorney, Agent, or Firm*—Antonelli, Terry & Wands

[57] ABSTRACT

A device for measuring a flatness of a plate such as a silicon wafer, a GGG wafer, a printed circuit board, a ceramic substrate, or the like. The measuring device is provided with a disc which is disposed in parallel with the plate on one of the surfaces of the plate and is driven by a rotating drive source and a plurality of detectors for detecting a distance from the detector to the surface of the plate, the detectors being disposed on the surface closer to the disc. With this arrangement, distance data from the plurality of the detectors to the surface of the plate is obtained during the course of the rotation of the disc, and a flatness of the plate is measured.

7 Claims, 14 Drawing Figures

FLATNESS MEASURING DEVICE

The present invention relates to a device for measuring degree of flatness of a substrate surface such as a silicon wafer, a GGG wafer, a printed circuit board, a ceramic substrate, or the like.

In order to form a pattern on a silicon wafer, a silicon wafer, coated over its entire surface with photoresistive material, is brought into exposure to a photomask pattern.

This pattern forming process, called a photolithography, is classified into a close-contact method by exposing the photoresist film in a state that the mask and the wafer are intimately coupled, a close disposed method in which the mask and the wafer are separated from each other several to several tens microns in exposing the photoresist film, and a projection method by optically projecting a mask pattern on the wafer.

In the pattern forming process, when the wafer is warped, it is difficult to uniformly expose the wafer with a discrete pattern over its entire surface. In this respect, it is essential that the wafer is flat. This necessitates a device for measuring degree of flatness of the wafer surface with a high precision and another device for flattening the wafer.

The present invention relates to the former device, or a flatness measuring device. To obtain a flat wafer, however, the two devices are necessary, as mentioned above. Therefore, before describing the present invention, a wafer flattening device disclosed in U.S. Pat. Ser. No. 245,193 now U.S. Pat. No. 4,391,511, filed on Mar. 18, 1981 will be described referring to FIGS. 1a and 1b.

In FIG. 1b, a wafer 1 is placed on a flattening device 5 and then a vacuum exhaust device 3 evacuates the air in the flattening device 5 under this condition. As the result of the evacuation operation of the device 3, the reverse side of the wafer is made to closely contact the device 5. For flattening the surface of the wafer 1, a vertical displacing means 2 is vertically displaced while observing the surface of the wafer 1 by means of the flatness measuring device 4. In this case, it is essential to precisely measure a flatness of the wafer surface.

The above discussion, which is on the silicon wafer, is correspondingly applicable for the GGG wafer, the printed circuit board, the ceramic substrate and the like. The substrate or board etc. for which the flatness measuring device is applied will be referred to merely as a "plate".

A capacitor type detector, an air micrometer or the like is generally used for detecting probes for detecting a height of the substrate surface. The detecting probes of this type are used also in the flatness measuring device according to the present invention. The measuring device of the present invention, like the prior art device, measures a flatness of the entire surface of the plate by measuring gaps between the tips of the detecting probes and the plate at several points on the plate surface.

The prior art measuring device will be described referring to FIGS. 2a, 2b, 3a, 3b, 4a and 4b. FIGS. 2a and 2b illustrate a flatness measuring device for measuring degree of flatness of a plate such as the wafer substrate 1 over its entire surface by using a single detecting probe 6. The detecting probe 6 is attached to a distal end of an arm 11 fixedly mounted to an X-Y table 8 which is driven in X and Y directions by means of drive sources 9 and 10. With this arrangement, the detecting probe 6 is moved on the plate 1 along a locus 12. Through the movement, a distance between the tip 7 of the detecting probe 6 and the plate 1 is measured, whereby degree of flatness of the plate 1 is measured. In this device, since the X-Y table 8 is driven in X and Y directions alternately, vibration occurs when changing the driving direction and, since the high speed drive of the X-Y plotter is difficult, it takes a long time for the measurement.

In a flatness measuring device shown in FIGS. 3a and 3b, a plurality of the detecting probes 6, arrayed in a linear or substantially linear fashion, are mounted to an arm 14 fixed to an X-axis table 15 which is driven by a drive source 16. The X-axis table is moved in an X direction 17, thereby measuring the degree of flatness over the entire surface of the plate 1. The measuring device needs a number of the detecting probes 6. And it must repetitively measure a variation of the flatness of the plate 1, so that the X-axis table must be moved reciprocably. Therefore, this device also suffers from the vibration when the table is turned, as in the device of FIGS. 2a and 2b.

In another prior art flatness measuring device shown in FIGS. 4a and 4b, a number of detecting probes 6 mounted on a mounting board 18, which sufficiently covers the entire surface of the plate 1, is mounted on the upper surface of the plate 1. With this arrangement, a flatness of the plate 1 is measured without moving the mounting board 18. The device, however, is expensive to manufacture because a number of detecting probes 6 are required.

Accordingly, an object of the present invention is to provide flatness measuring device which obviates the drawbacks of the above-described conventional devices and is able to measure a flatness of the plate surface at a high speed and with a high accuracy and no vibration.

To achieve the above-mentioned object, in the present invention, a rotating disc is disposed in parallel with a plate on one side of the plate. A plurality of detecting means to detect a distance from the rotating disc to the surface of the plate is provided on the side of the rotating disc closer to the plate. During the course of the rotation of the rotating disc, detecting signals are obtained from the plurality of the detecting means.

Other objects and features of the present invention will be apparent from the following description in connection with the accompanying drawings, wherein:

FIG. 1b is a longitudinal cross sectional view of the flattening device of FIG. 1a;

FIG. 2b is a longitudinal cross sectional view of the flattening device of FIG. 2a;

FIG. 3b is a longitudinal cross sectional view of the flattening device of FIG. 3a;

FIG. 4b is a longitudinal cross sectional view of the flatness measuring device of FIG. 4a;

Figure 1A:
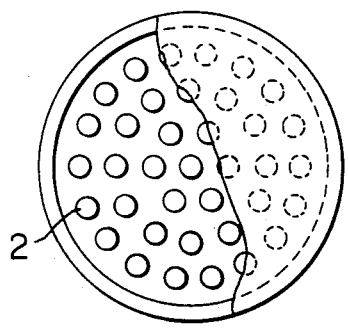
FIG. 1a is a schematic, partially cut away, view of a prior art flattening device taken in the direction of the arrows $I_a$—$I_a$ in FIG. 1b.
Figure 1B:
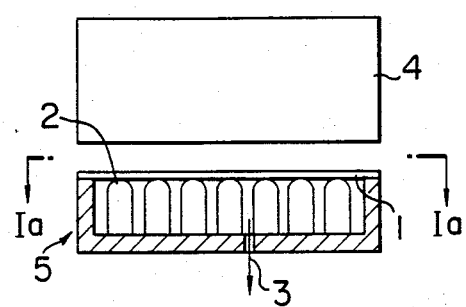
Figure 2A:
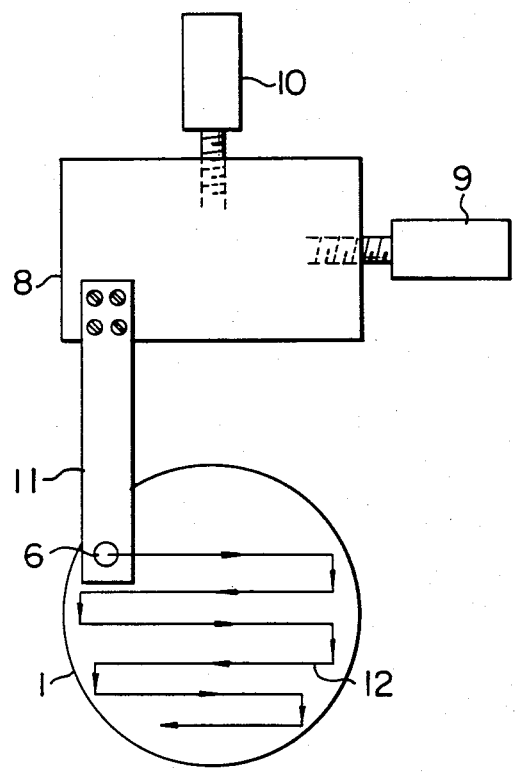
FIG. 2a is a schematic plan view of a prior art flatness measuring device.
Figure 2B:
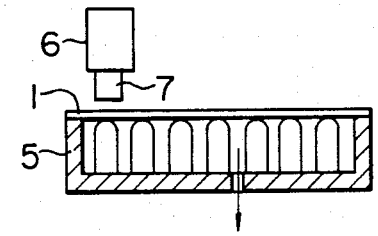
Figure 3A:
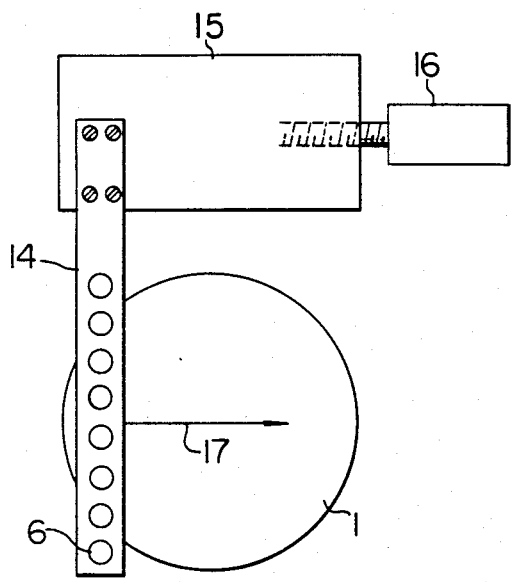
FIG. 3a is a schematic plan view of a further prior art flatness measuring device.
Figure 3B:
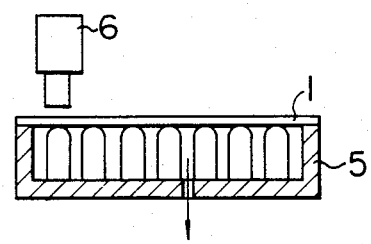
Figure 5:
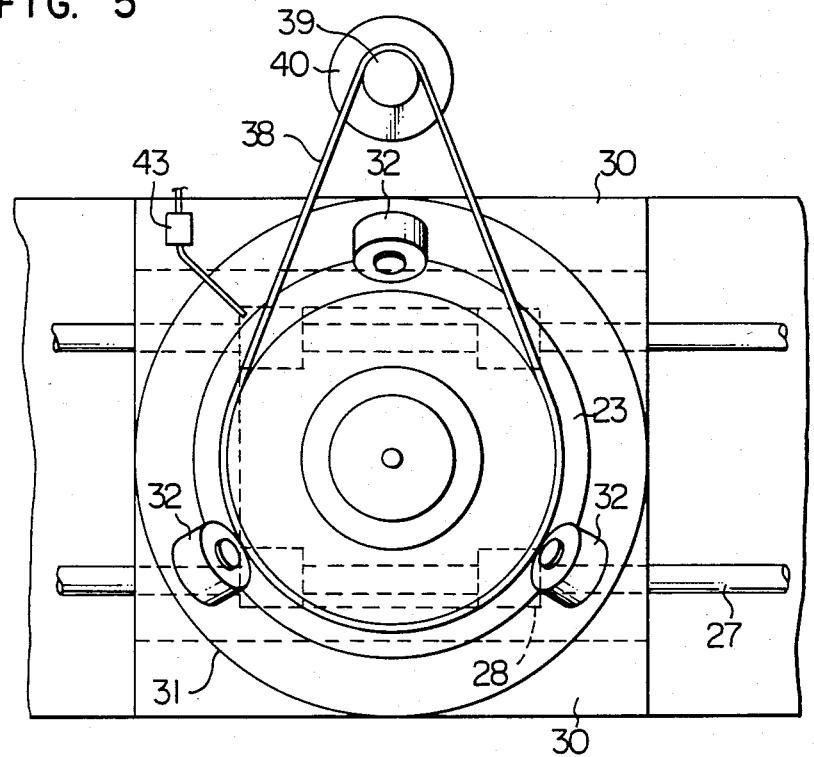
FIG. 5 is a schematic plan view of a flatness measuring device constructed in accordance with the present invention.
Figure 6:
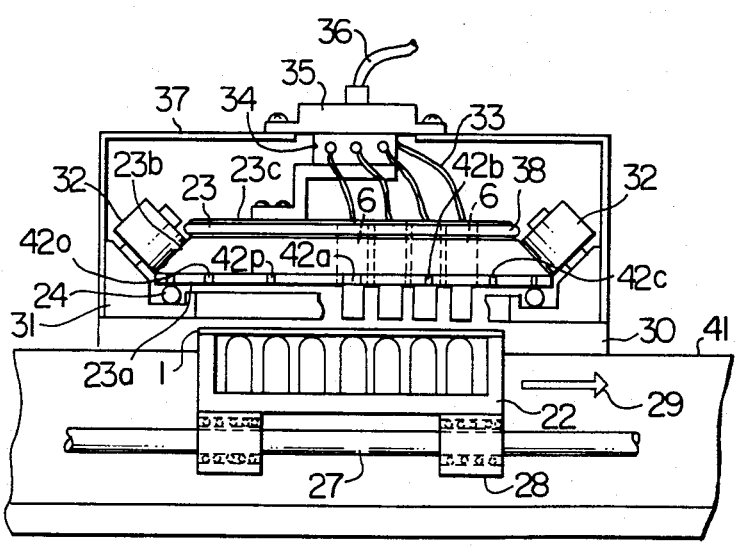
FIG. 6 is a schematic front view of the flatness measuring device of FIG. 5.
Figure 7:
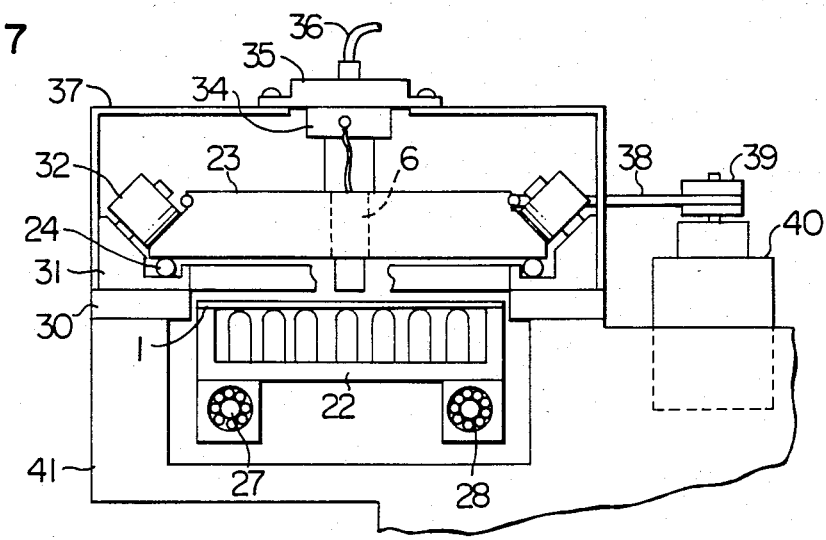
FIG. 7 is a right side view of the measuring flatness device of FIG. 5.

Referring now to the drawings wherein like reference numerals are used throughout the various views to designate like parts and, more particularly, to FIGS. 5-7, according to these Figures, a means 22 is provided for fixing and carrying a plate 1, with fixing/carrying means 22 being, for example, constructed in the same manner as the flattening device shown in FIGS. 1a and 1b. In the flattening device in FIGS. 1a and 1b, the substrate is fixed by the vacuum exhaust device, but it may be fixed by other fixing devices. The fixing/carrying means 22, in order to flatten the plate within the device, must, for example, have a flattening function as proposed in the aforementioned U.S. Pat. No. 4,391,511. The means 22 is held on a guide rail 27 provided on the lower side of the device by means of linear bearings 28, and is movable in a direction of an arrow 29 by means of a drive source (not shown). A flatness of the plate 1 is detected at the station as shown and then is flattened on the basis of the detected flatness. After the flattening, the plate 1 is moved in the direction of the arrow 29 and a circuit pattern is exposed on the plate 1 at a succeeding station (not shown).

Above a fixed location of the plate 1 shown in FIG. 6, a disc 23 is disposed in parallel with the plate 1. The disc 23 is carried on a base 31 through steel balls 24 manufactured with a high accuracy. The upper surface of the base 31 and the lower surface 23a of the disc 23, contacting with the steel balls 24, are carefully and precisely flattened. The base 31, circular in shape, is fixed on a body 41 by means of a couple of spacers 30.

The disc 23, having a trapezoidal cross section and shaped like a truncated cone in an outside view includes a shoulder portion (slanted portion) 23b in contact with a plurality of rotating bearings 32 mounted to the base 31. The rotating bearings 32 uniformly press the disc 23 downwardly, setting up a rotating center in the disc 23. Therefore, at least three rotating bearings 32 are used and mounted to the base 31 in a slanted fashion, as shown in FIGS. 6 and 7. With three rotating bearings, the bearings are disposed preferably equidistantly at, for example, 120° from each other.

A belt groove 23c is formed around the upper shoulder portion 23b of the disc 23. A belt 38 is wound around a pulley 39 of a motor 40 and the belt groove 23c. Accordingly, the disc 23 continues its rotation in a fixed direction, being precisely kept parallel to the plate 1, by means of the combination of the base 31, the steel balls 24 and the rotating bearings 32.

The disc 23 is provided with a plurality of detecting probes 6 directed at their tips toward the surface of the plate 1 for detecting distances from the tips thereof to the surface of the plate 1.

Figure 8:
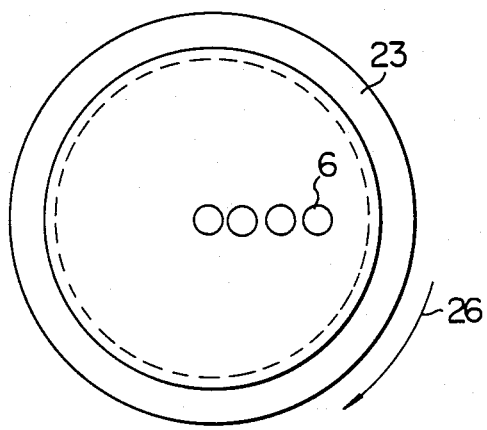
FIG. 8 is a plan view of another embodiment of a flatness measuring device constructed in accordance with the present invention using rotating discs.
Figure 9:
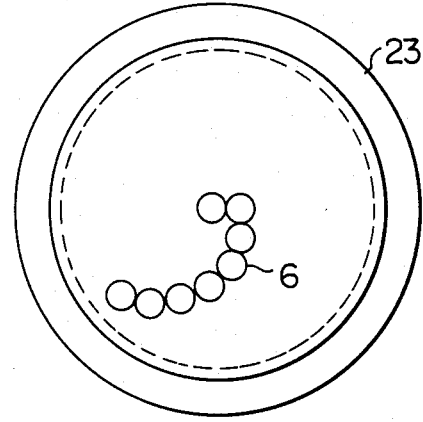
FIG. 9 is a plan view of a further embodiment of a flatness measuring device according to the present invention using rotating discs.

The plurality of detecting probes 6 mounted to the disc 23 are arranged in a linear or curved fashion from the center of the disc 23 to the peripheral portion thereof. As shown in FIG. 8, when the disc 23 is rotated in a direction of an arrow 26, the detecting probes 6 depict circular orbits about the center of the disc 23 and detect distances between the tips thereof and the surfaces of corresponding locations of the plate 1, thereby measuring degree of flatness of the plate 1 over its entire surface. When the detecting probes 6 are arrayed in a linear fashion as shown in FIG. 8, it is impossible to arrange the probes in such a manner that an interval between the adjacent detecting probes is shorter than the diameter of each detecting probe. The interval may be shortened less than the diameter by arraying the detecting probes 6 in a curved fashion as shown in FIG. 9 in which the probes 6 are shifted little by little from a line. This array of the detecting probes 6 ensures more accurate measurements of the plate surface than that of FIG. 8.

The detecting signals from the detecting probes 6 are led out through cables 33. The cables 33 are fixed to a rotating side 34 of a slip ring which is held by the disc 23 and moves together with the disc 23. The detecting signals further travel from a stationary side 35 of the slip ring, held by a holder frame 37 fixed to the spacers 30, through a cable 36, to a signal processing means containing a display, an arithmetic unit, a CRT and the like. The signal processing means is not essential to the present invention and hence is not described in detail. One of the essential points of the present invention resides in a mechanism for measuring degree of flatness of the plate quickly, accurately, free from vibration and without increasing the number of detecting probes. The signal from the cable 36 is an analog signal produced through one revolution of the disc 23. For the signal processing, the analog signal may directly be used for representing the flatness information of the plate 1. Alternately, the analog signal may be converted, every given rotational angle of the disc 23, into a digital signal which is used as the flatness information of the plate 1. In any case of using a digital or analog signal, it is desirable to provide means for detecting rotation position of the disc 23. The disc 23 in FIG. 6 is additionally provided with means for detecting timings to perform the A/D conversion, that is to say, for finding measuring locations on the plate 1, i.e. rotation position of the disc 23. To be more specific, a plurality of marks 42a, 42b, . . . equidistantly arranged around the lower portion of the shoulder 23b of the disc 23. When the A/D conversion is performed every 1/16 revolution of the disc 23, sixteen marks 42a, 42b, . . . 42p are arranged at the lower shoulder portion with the marks being spaced from each other by 22.5°. In this case, the passage of the mark is sensed by a photosensor 43 shown in FIG. 5 and an output signal from the photosensor is used as a timing signal for the A/D conversion or the measuring position data for the plate 1. If one of the sixteen marks is longer than the remaining ones, a signal representing a rotation start or an origin of the timing signal can be obtained from the longer mark.

Figure 10:
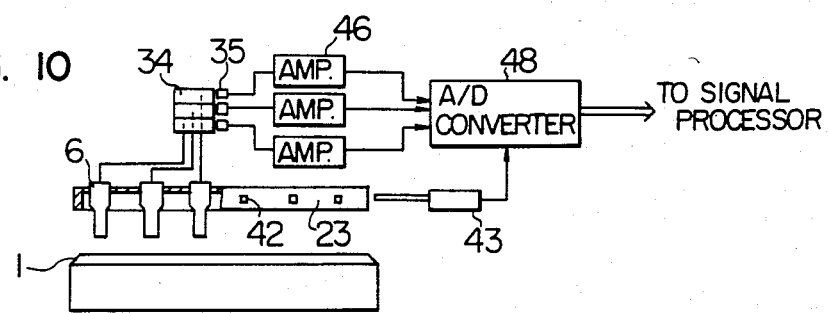
FIG. 10 is a schematic circuit diagram for processing output signals supplied by detecting probes in a flatness measuring device constructed in accordance with the present invention.

FIG. 10 provides a circuit diagram for processing output signals from the detecting probes 6 in synchronism with timing signal obtained by the photosensor 43 to obtain the degree of flatness of the plate 1 more particularly in FIG. 10, wherein the detecting probes 6 are fashioned as capacitor type probes. current-voltage converting amplifiers 46 are provided which each of which convert output current from the corresponding detecting probe 6 into a current signal, and an analog-digital converter 48 is provided for converting analog voltage signals from the amplifiers 46 into digital signals in response to a timing signal from the photosensor 43. The digital output signal of the A/D converter 48 is applied to a signal processor including a CPU (not shown) for calculating degree of flatness of the plate 1.

With such an arrangement of the flatness measuring device of the present invention, the device is free from the vibration which caused in the conventional device at the turning points in the movement of the X-Y table, thereby considerably improving an accuracy of the flatness measurement. The prior art X-Y table encounters a great vibration when moved at high speed, so that the increase of the speed of the table movement is limited. On the other hand, the movement of the flatness measuring device according to the present invention is a unidirectional rotation. Therefore, the detecting speed of the flatness measuring device is improved 10 to 100 times over the prior art.

Figure 4A:
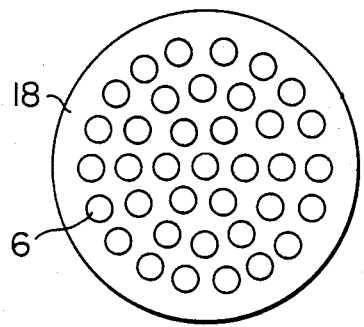
FIG. 4a is a schematic plan view of another prior art flatness measuring device.
Figure 4B:
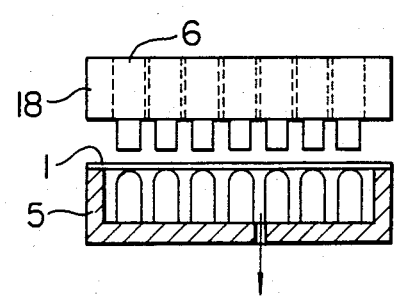

In order to eliminate the problem arising from the vibration, the prior device shown in FIGS. 4a and 4b uses a number of detecting probes for detecting flatness of the plate without moving the detecting probes. The problem of the device, however, is that a number of the detecting probes are required. For example, the measuring device of the present invention can attain, by using only fours detecting probes, the effects attained by the prior art device by using 37 detecting probes. Considering recent demands for semiconductor wafers outer diameter of the semiconductor wafer increases year by year and, with this trend for larger diameter wafers, the prior art device must increase the number of the detecting probes. A relationship among the number l of arrays of the detecting probes, the number m of the probes necessary for the device of the present invention, and the number n of the detecting probes for the prior art device are shown in Table 1 hereinbelow.

TABLE 1

| l | m | n | n − m |
|---|---|---|---|
| 0 | 1 | 1 | 0 |
| 1 | 2 | 7 | 5 |
| 2 | 3 | 19 | 16 |
| 3 | 4 | 37 | 33 |
| 4 | 5 | 61 | 56 |
| 5 | 6 | 91 | 85 |
| 6 | 7 | 127 | 120 |

As shown in Table 1, in the case of a silicon wafer of a 5 inches (approximately 127 mm) in diameter, the effective diameter is 120 mm. Accordingly, in measuring a flatness of the substrate at intervals of 10 mm, l=6 and n−m=120. Therefore, according to the device of the present invention, the detecting probes can be reduced by 120.

What is claim is:

1. A device for measuring a degree of flatness of a surface of a plate the device comprising:
   holding means for holding said plate in a manner so as to prevent the plate from being moved and rotated when the plate is measured;
   a rotatably supported disc disposed in parallel with one surface of said plate;
   a plurality of detecting means mounted to said disc for rotation therewith for detecting distances from tips thereof to said one of the surfaces of said plate, said detecting means being arranged on a line extending radially outwardly from a center of said disc;
   drive means for rotating said disc; and
   output means for leading out detecting signals from said detecting means.

2. A device for measuring a degree of flatness of a surface of a plate, the device comprising:
   holding means for holding said plate in a manner so as to prevent the plate from being moved and rotated when the plate is measured;
   a rotatably supported disc disposed in parallel, with one surface of said plate;
   a plurality of detecting means mounted to said disc for detecting distances from tips thereof to said one of the surfaces of said plate, said detecting means are arrayed in a curved fashion from a center of said disc toward a peripheral portion thereof.

3. A device for measuring a degree of flatness of a surface of a plate, the device comprising:
   holding means for holding said plaoe in a manner so as to prevent the plate from being moved and rotated when the plate is measured;
   a rotatably supported disc disposed in parallel with one of the surfaces of said plate, said disc is shaped like a trapezoid in cross section and a truncated cone as viewed outside and is rotatably supported at a lower surface thereof and includes a trapezoidal shaped slanted portion;
   a plurality of detecting means mounted to said disc for detecting distance from tips thereof to said one of the surfaces of said plate, said detecting means being arranged on a line extending radially outward from a center of said disc;
   drive means for rotating said disc; and
   output means for leading out detecting signals from said detecting means.

4. A flatness measuring device according to claim 3, wherein members for rotatably supporting the slanted portion of said disc include three slantedly mounted rotating bearings disposed at an interval of 120° from each other.

5. A device for measuring a degree of flatness of a surface of a plate to be measured, the device comprising:
   holding means for holding said plate to be measured in a manner such that said plate is prevented from being moved and rotated when said plate is measured;
   a rotatably supported disc disposed in parallel with and in opposition to one surface of said plate;
   a plurality of detecting means mounted to said disc for detecting distances between tips thereof and said opposing surface of said plate, said plurality of detecting means being arrayed so as to be spaced by different distances from a center of said disc in such a manner that no two adjacent detecting means are aligned on the same radius of said disc;
   drive means for rotating said disc; and
   output means for leading out detecting signals from said detecting means.

6. A flatness measuring device according to claim 5, wherein said disc has a trapezoidal cross sectional configuration and a truncated cone as viewed from the outside and is rotatably supported at a lower surface thereof, the disc includes a trapezoidal shaped slanted portion.

7. A flatness measuring device according to claim 6, wherein members for rotatably supporting the slanted portion of said disc include at least three slantedly mounted rotating bearings disposed at an interval of 120° with respect to each other.

* * * * *